US012360550B2

(12) United States Patent
Avital et al.

(10) Patent No.: US 12,360,550 B2
(45) Date of Patent: Jul. 15, 2025

(54) APPARATUS AND METHOD FOR GLOBAL TO LOCAL CLOCK COMPENSATION

(71) Applicant: Intel Corporation, Santa Clara, CA (US)

(72) Inventors: Ariel Elad Avital, Kiryat Bialik (IL); Yossi Ben Simon, Karmiel (IL)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 17/467,915

(22) Filed: Sep. 7, 2021

(65) Prior Publication Data

US 2023/0075013 A1 Mar. 9, 2023

(51) Int. Cl.
*G06F 1/08* (2006.01)
*G06F 1/10* (2006.01)
*G06F 1/14* (2006.01)

(52) U.S. Cl.
CPC .................. *G06F 1/08* (2013.01); *G06F 1/14* (2013.01); *G06F 1/10* (2013.01)

(58) Field of Classification Search
CPC .................. G06F 1/08; G06F 1/10; G06F 1/14
See application file for complete search history.

(56) References Cited

U.S. PATENT DOCUMENTS

| 6,075,832 A * | 6/2000 | Geannopoulos | H03L 7/0816 713/401 |
| 6,211,740 B1 * | 4/2001 | Dai | H03L 7/081 331/25 |
| 2002/0140487 A1 * | 10/2002 | Fayneh | G06F 1/10 327/295 |
| 2020/0143853 A1 * | 5/2020 | Navaratnam | G11C 7/1084 |

* cited by examiner

*Primary Examiner* — Terrell S Johnson
(74) *Attorney, Agent, or Firm* — NICHOLSON DE VOS WEBSTER & ELLIOTT LLP

(57) ABSTRACT

A clock source outputs a clock signal. A first delay line receives a first clock source signal and produces a first output, the first clock source signal at least partially based on the clock signal. A first clock spine receives the first output and produces a global reference clock signal. A second delay line receives a second clock source signal and produces a second output, the second clock source signal at least partially based on the clock signal. A second clock spine receives the second output and produces a global feedback clock signal. A global phase detector detects a phase difference between the global reference clock signal and the global feedback clock signal to produce a global phase detector output. The second clock source signal is controlled at least partially based on the global phase detector output.

17 Claims, 5 Drawing Sheets

APPARATUS AND METHOD FOR GLOBAL TO LOCAL CLOCK COMPENSATION

BACKGROUND

Technical Field

This disclosure relates to circuits for manipulating a clock signal and, in particular, to circuits for compensating such a signal in stages.

Related Art

Today, systems-on-a-chip (SOCs) have become more and more complex, with an increased number of intellectual property units (IPs) (e.g., cores, fabrics, graphics execution units [EUs]) running in a synchronous manner. On top of that, IPs, such as Intel® Architecture (IA) cores and graphics processors, have become larger and more complex.

In general, a clock compensator gets a clock from a clock source, spreads the clock using clock distribution (e.g., H tree or spines), and compensates the clock to minimize skew using a phase detector, a FSM and delay-lines.

DETAILED DESCRIPTION

A conventional clock compensator includes a clock de-skewing HIP unit that compensates within-die variation (WID) between clock networks. The inclusion of one or more compensators in a clock distribution unit helps to check the health of a clock network.

The synchronous nature of IPs uses a high-quality clock distribution network to ensure a low-skew clock signal. This use determines an increased complexity in clock distribution.

Even inside one IP (e.g., an IA core, a common connectivity framework [CCF], a memory subsystem), the same clock domain covers multiple networks across the whole area. These multiple networks suffer from WID of the devices, as well as die-to-die variation (D2D). This variation can lead to clock skew.

Figure 1:
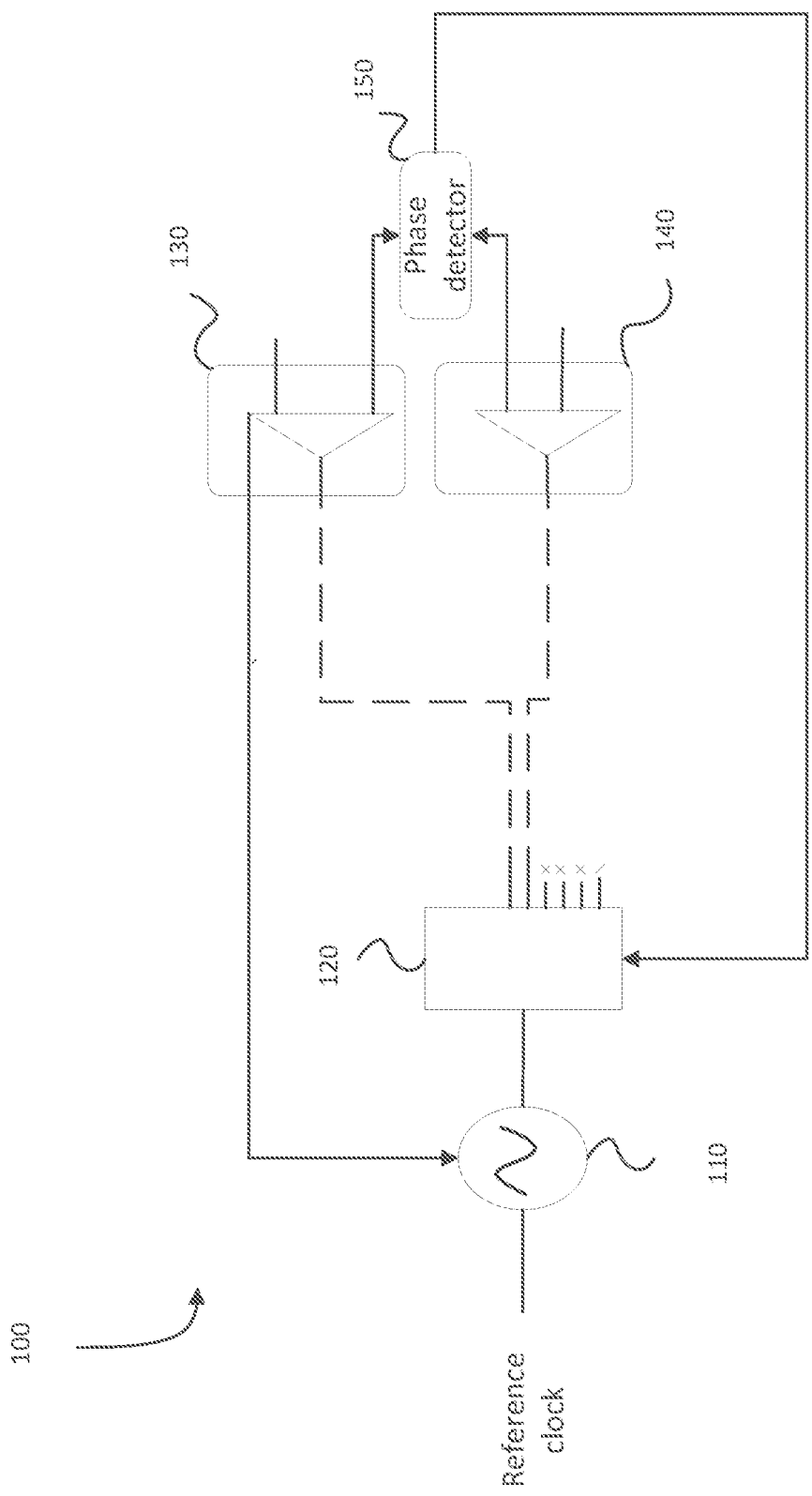
FIG. 1 illustrates an exemplary basic clock structure.

To overcome this variation, there are compensator delay-lines at the root of the clock network (e.g., point of divergence [POD]) that are tuned at boot to minimize the skew of the clock in different regions, as shown in FIG. 1.

FIG. 1 illustrates an exemplary basic clock structure 100. The basic clock structure 100 includes a clock source 110, a compensator 120, a first clock network 130, a second clock network 140, and a phase detector 150.

The clock source 110 receives a reference clock and produces a clock signal. The clock source 110 outputs the clock signal to compensator 120.

The compensator 120 receives the clock signal from the clock source 110. The compensator 120 performs compensation on the clock signal, based on a phase detector output received from the phase detector 150.

The compensator 120 includes a standard number of output lines, such as six. One of the output lines of the compensator 120 outputs a first clock source signal to an input of first clock network 130. Another of the output lines of the compensator 120 outputs a second clock source signal to an input of second clock network 140. Thus, the compensator 120 is a point of divergence for the basic clock structure 100. The remaining four of the six output lines of compensator 120 are not connected.

The first clock network 130 receives the first clock source signal from the compensator 120 and distributes the first clock source signal to a first region. The second clock network 140 receives the second clock source signal from the compensator 120 and distributes the second clock source signal to a second region.

The first clock network 130 outputs a feedback clock signal to the clock source 110.

The first clock network 130 also outputs a reference signal to an input of the phase detector 150. The second clock network 140 outputs a feedback signal to an input of the phase detector 150.

The phase detector 150 detects a phase difference between the reference signal and the feedback signal to produce the phase detector output. The phase detector 150 outputs the phase detector output to the compensator 120.

The compensator 120 is also used for skew monitoring by reading a tunable delay-line compensator code, once compensation has completed.

Conventional compensators have several disadvantages. For example, traditional compensators contain several (e.g., six) tunable delay lines in a single hard intellectual property (HIP) unit that serve all clock structures spread among thousands of microns. Thus, a system might dedicate substantial surface area to the HIP unit, even though not all of the six delay lines are used.

In addition, traditional compensator logic does not include a common register interface (CRI) controller or sideband (SB) logic. Accordingly, the compensator is placed close to a block that integrates the CRI controller. In many implementations, this block is a phase-locked loop (PLL).

Such compensator placement disadvantageously places the compensator away from the POD. Accordingly, more stages are used, producing a longer delay clock network (with a higher skew or variation), and increasing power consumption.

The main disadvantages of using a traditional clock compensator for compensating skew pertain to power, area, and skew variation. With regard to power, a traditional compensator HIP unit contains a standard number (e.g., six) of independent delay lines. These delay lines consume leakage power, even if they are unused (e.g., are not connected). Further, conventional clock distribution structures spread the mode of work, and each clock structure (e.g., spine) uses clock routing from a different compensator output, as illustrated in FIG. 1. Accordingly, huge power consumption is caused.

As to area, the clock compensator is centralized in a specific place, usually abutted to the PLL. Further, the clock compensator contains 6 independent delay-lines, a finite state machine (FSM), hooks for verifying designs and testing printed circuit boards after manufacture (e.g., JTAG

[Joint Test Action Group] and Intel® DFx), fuse, and a communication registers mechanism. These components overall consume a big area.

Turning to skew variation, the conventional compensator HIP unit is abutted to the PLL, since the compensator acts as a clock splitter. Thus, the POD is automatically set at this point, which is deeper, and the skew variation is high.

Figure 2:
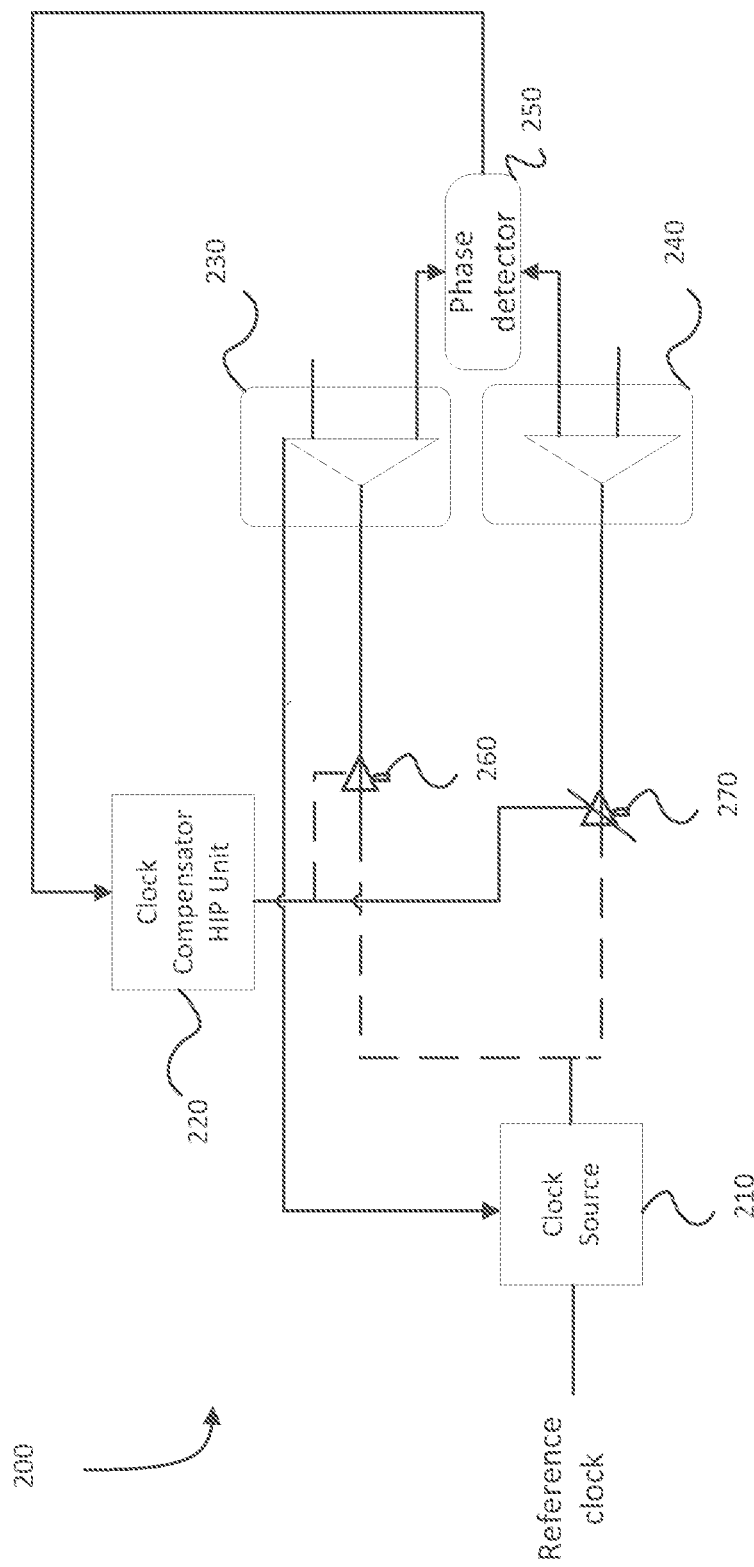
FIG. 2 illustrates a high-level clock distribution structure, according to an implementation of the present disclosure.

FIG. 2 illustrates a high-level clock distribution structure 200, according to an implementation of the present disclosure. The clock distribution structure 200 includes a clock source 210, a clock compensator HIP (hardened intellectual property) 220, a first clock network 230, a second clock network 240, a phase detector 250, a fixed delay line 260, and a tunable delay line 270.

The clock source 210 receives a reference clock and produces a clock signal. The clock source 210 includes, for example, a phase-locked loop. The clock source 210 outputs the clock signal to a node. Thus, the node is the point of divergence.

The fixed delay line 260 receives a first clock source signal based on the clock signal at the node. The fixed delay line 260 is a fixed compensator HIP delay line. The fixed delay line 260 delays the first clock source signal by a fixed amount to produce a first delayed clock source signal. The fixed delay line 260 outputs the first delayed clock source signal to an input of the first clock network 230.

The tunable delay line 270 receives a second clock source signal based on the clock signal at the node. That is, the tunable delay line 270 is in parallel with the fixed delay line 260. The tunable delay line 270 can then delay the second clock source signal by a tunable amount to produce a second delayed clock source signal. The tunable amount at least partially is based on a control signal received from the clock compensator HIP unit 220. The tunable delay line 270 outputs the second delayed clock source signal to an input of the second clock network 240.

The first clock network 230 receives the first delayed clock source signal from the fixed delay line 260 and distributes the first delayed clock source signal. For example, the first clock network 230 outputs the first delayed clock source signal to a first end point (e.g., first global driver) (not pictured). The first global driver then drives components in a first region of an apparatus with the first delayed clock source signal.

Similarly, the second clock network 240 receives the second delayed clock source signal from the tunable delay line 270 and distributes the second delayed clock source signal. For example, the second clock network 240 outputs the second delayed clock source signal to a second end point (e.g., second global driver) (not pictured). The second global driver then drives components in a second region of the apparatus with the second delayed clock source signal.

The first clock network 230 outputs the first delayed clock source signal to the clock source 210 as a feedback clock signal. Thus, the clock source 210 can control the clock signal, at least in part based on the feedback clock signal.

The first clock network 230 also outputs the first delayed clock source signal to the phase detector 250 as a reference signal. The second clock network 240 outputs the second delayed clock source signal to the phase detector 250 as a feedback signal.

The phase detector 250 receives the reference signal from the first clock network 230 and the feedback signal from the second clock network 240. The phase detector 250 detects a phase difference between the reference signal and the feedback signal to produce a phase detector output. The phase detector 250 outputs the phase detector output to the clock compensator HIP unit 220.

The clock compensator HIP unit 220 receives the phase detector output and produces the control signal. The clock compensator HIP unit 220 can include a FSM (finite state machine). The clock compensator HIP unit 220 outputs the control signal to the tunable delay line 270.

In some implementations, the clock compensator HIP unit 220 also outputs the control signal to the fixed delay line 260. The fixed delay line 260 can control the fixed amount of delay, at least in part based on the control signal, for example.

In the implementation illustrated in FIG. 2, a tunable delay-line compensator (e.g., clock compensator) IP unit can be instantiated along the die to collect statistical information about clock quality. The tunable delay-line compensator can also check the impact of PVT (process, voltage, temperature) variation or change, both in-die and die-to-die.

Some implementations of the clock distribution structure 200 reduce the depth of the clock network (and, thus, total clock delay) and reduce the distance of the POD from the clock networks 230, 240.

Despite an increase in complexity, speed, and performance of IPs and SOCs, the clock skew between different regions and blocks can be measured and compensated with the clock distribution structure 200.

The clock distribution structure 200 also can be used in the silicon validation period to check design robustness. Further, the clock distribution structure 200 can be used in HVM (high volume manufacturing) testing for quantifying and compensating skew between clock areas. Thus, some implementations of the clock distribution structure 200 allow issues to be caught in an early stage of a project and to select dice that do not meet specifications.

Some implementations of the clock distribution structure 200 topology for in-die clock skew compensation can reduce the dependency between a conventional global compensator and a PLL.

Therefore, in some implementations of the present disclosure, delay-line local compensators are spread according to the clock design POD and power efficiency. Indeed, some implementations of the present disclosure spread local delay-lines, a local FSM, and DFx blocks close to the clock spines (e.g., the structures that perform the clock distribution).

Thus, some implementations can provide floorplan flexibility for placing and routing the local delay-line and clock structures.

Some implementations according to the present disclosure also can improve clock quality, since the clock POD is closer to the clock distribution structure spread (e.g., clock spine), as shown in FIG. 2. Further, the clock distribution structure increases flexibility and permits design of improved clock distribution per floorplan stock-keeping unit (SKU).

Thus, particular implementations of the present disclosure are efficient in terms of power and area and can reduce skew variation.

From an area and leakage perspective, some implementations of the present disclosure can add delay-line HIP units per spine (e.g., clock network) and avoid use of a conventional compensator HIP unit containing six delay-lines.

From a power perspective, as shown in FIG. 2, some implementations can reduce the clock source path until the POD by sharing the same routing resources. This closer POD can reduce the skew variation among the clock networks.

Some implementations can be applied in complicated structures (e.g., very long DIE) by separating large clock networks into local clock networks, which compensate locally and can be compensated globally.

Using the present disclosure, clock compensation for multiple dies, partitions and blocks can be combined.

Thus, some implementations provide a high-quality, high-speed clock all over a chip, while supporting very large DICEs.

Various implementations of the present disclosure divide a conventional clock compensation structure into two or more compensation structure stages (e.g., global and local). In such an implementation, one stage compensates within a local network (e.g., local compensation), and another stage compensates between all local parts (e.g., global compensation), as illustrated in FIG. 3.

Figure 3:
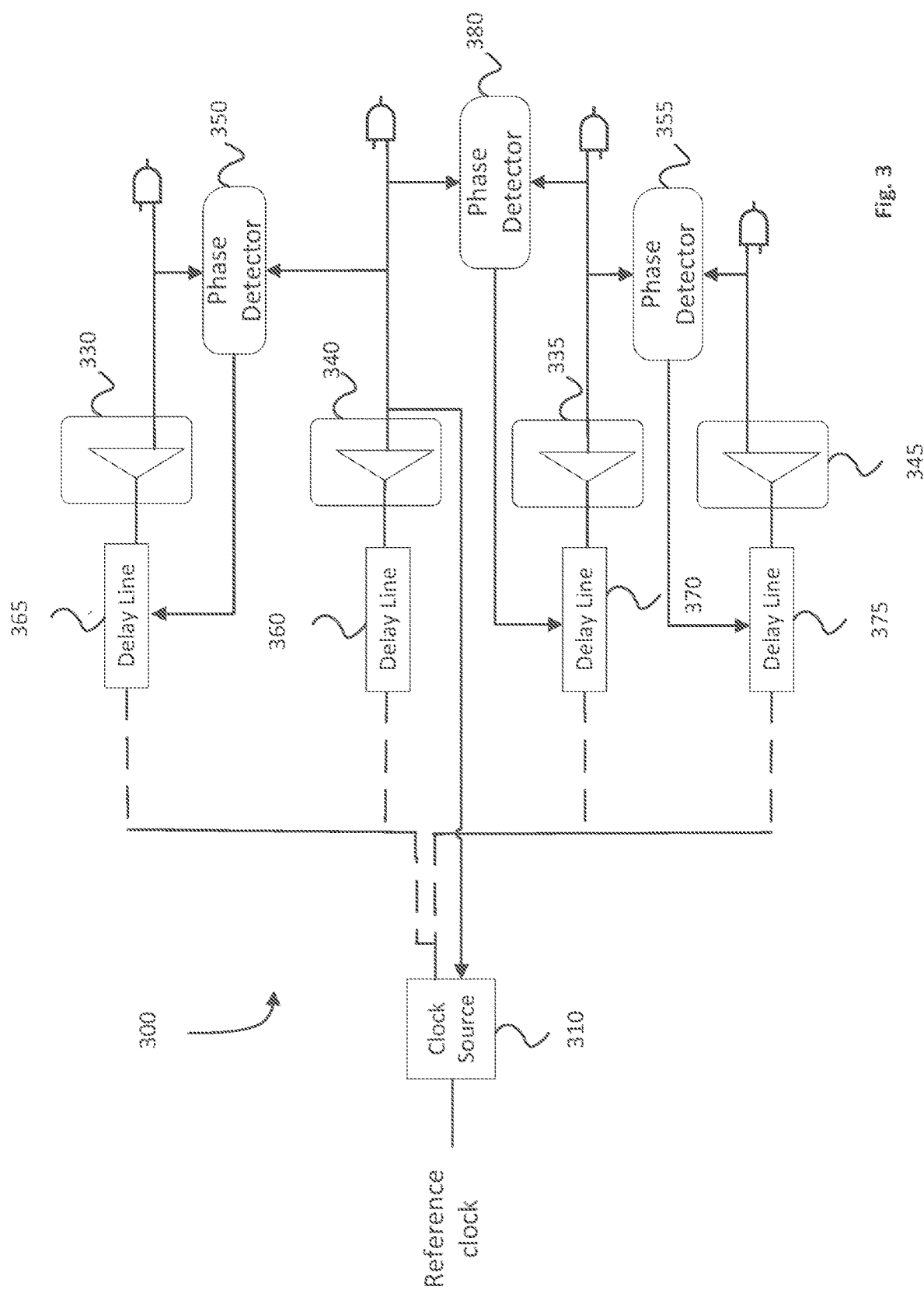
FIG. 3 illustrates a detailed clock distribution structure, according to an implementation of the present disclosure.

FIG. 3 represents a compensation topology especially for large DICEs. In large DICEs, very low skew is desired across thousands of microns at a high-speed frequency (e.g., 6 Ghz, 7 Ghz based on analog delay-line (ADL) 10 nm+++). Thus, FIG. 3 illustrates a detailed clock distribution structure 300, according to an implementation of the present disclosure.

In the first compensation stage (e.g., a global compensation sequence), a global main compensation structure starts in a first point of divergence, as illustrated in the middle of the clock structure 300. The clock structure 300 compensates, for example, clock networks 335, 340, using a phase detector 380 between the networks.

In general, more networks (and, thus, more PODs) to be compensated can be added in parallel in the global compensation sequence stage.

Figure 4:
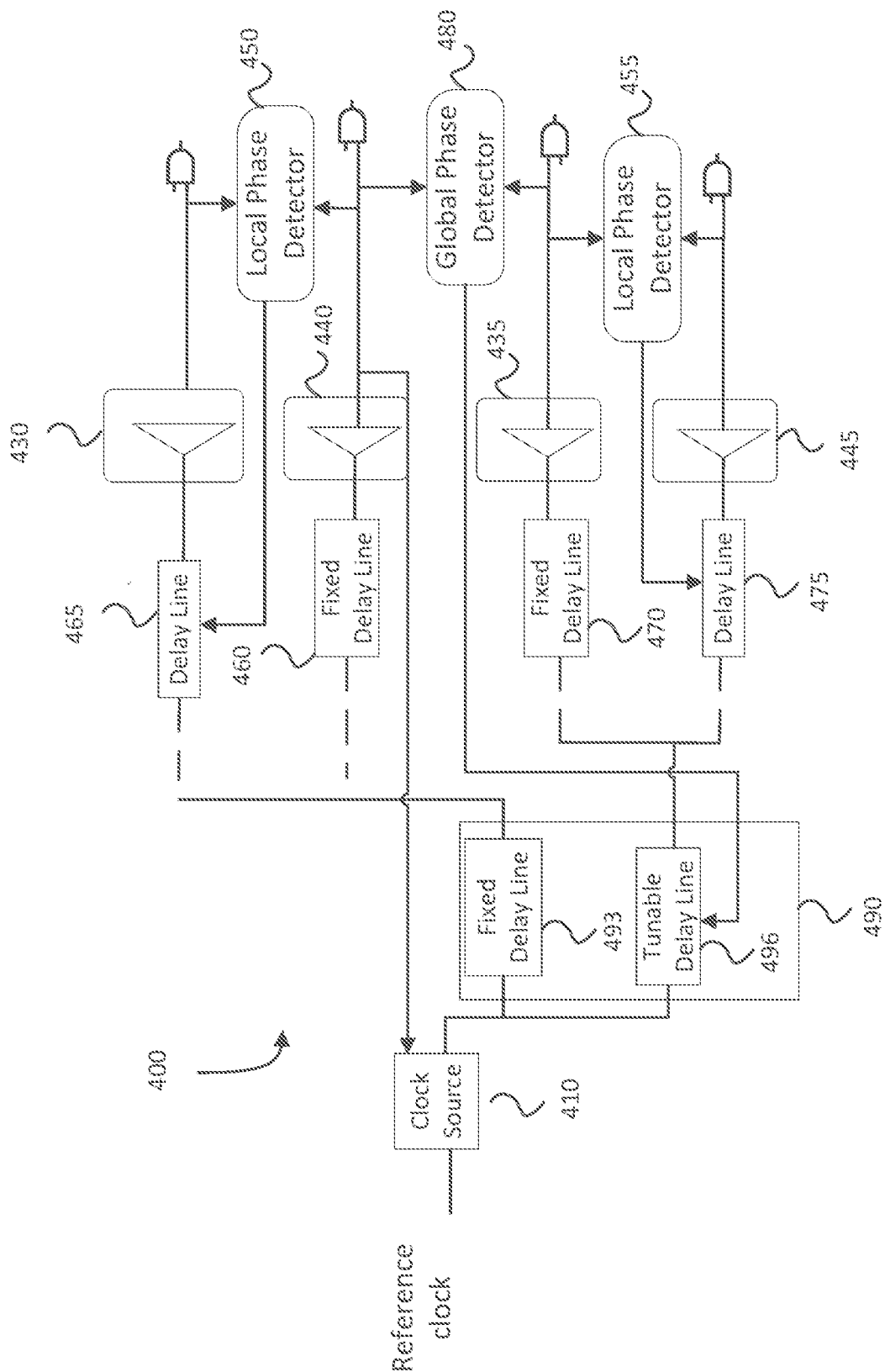
FIG. 4 illustrates a detailed clock distribution structure including a global compensator, according to an implementation of the present disclosure.

The second compensation stage (e.g., a local compensation sequence) compensates local parts (as illustrated in FIGS. 3-4) and completes the full compensation sequence. This part is done in parallel to save time and to reduce use of cascaded compensation.

The use of cascaded compensation should be reduced, because a cascaded compensation mechanism accumulates skew variation between compensation stages.

The clock distribution structure 300 includes a clock source 310, four delay lines (i.e., delay line 365, delay line 360, delay line 370, and delay line 375), four clock networks (i.e., clock network 330, clock network 335, clock network 340, and clock network 345), four global drivers, two local phase detectors (i.e., local phase detector 350 and local phase detector 355), and global phase detector 380.

The clock source 310 receives a reference clock signal and outputs a global clock signal to a first node. The clock source 310 includes, for example, a phase-locked loop. The clock source 310 can control the global clock signal at least partially based on a feedback clock signal received from the clock network 340.

An upper portion of the clock distribution structure 300, including delay line 360 and delay line 365, is at least indirectly connected to the first node and receives a first signal at least partially based on the global clock signal.

A lower portion of the clock distribution structure, including delay line 370 and delay line 375, is at least indirectly connected to the first node in parallel with the upper portion. The lower portion receives a second signal at least partially based on the global clock signal.

Ideally, the first signal is identical to the second signal. However, the paths diverge from the first node, making the first node a POD. Manufacturing imperfections lead the first signal to diverge slightly from the second signal.

Because the delay line 360 is in parallel with the delay line 365, a path from the first node to the delay line 360 diverges at a second node from a path to the delay line 365. Likewise, because the delay line 370 is in parallel with the delay line 375, a path from the first node to the delay line 370 diverges at a third node from a path to the delay line 375.

Thus, the second and third nodes define points of divergence for the local compensation sequence. These PODs can be defined for additional local networks toward additional, respective spine inputs.

The delay line 360 receives the first signal at least partially based on the global clock signal. The delay line 360 applies a fixed delay to the first signal to produce a first delayed signal output to the clock network 340.

The delay line 365 also receives the first signal at least partially based on the global clock signal. The delay line 365 applies a tunable delay to the first signal to produce a second delayed signal output to the clock network 330.

The delay line 370 receives the second signal at least partially based on the global clock signal. The delay line 370 applies a tunable delay to the second signal to produce a third delayed signal output to the clock network 335.

The delay line 375 also receives the second signal at least partially based on the global clock signal. The delay line 375 applies a tunable delay to the second signal to produce a fourth delayed signal output to the clock network 345.

The clock network 340 receives the first delayed signal from the delay line 360 and distributes the first delayed signal to a global driver. The clock network 340 also outputs the first delayed signal to the local phase detector 350 as a reference signal. In addition, the clock network 340 outputs the first delayed signal to the global phase detector 380 as a reference signal. Further, the clock network 340 outputs the first delayed signal to the clock source 310 as a feedback clock signal.

The clock network 330 receives the second delayed signal from the delay line 365 and distributes the second delayed signal to a global driver. The clock network 330 also outputs the second delayed signal to the local phase detector 350 as a feedback signal.

The clock network 335 receives the third delayed signal from the delay line 370 and distributes the third delayed signal to a global driver. The clock network 335 also outputs the third delayed signal to the global phase detector 380 as a feedback signal. In addition, the clock network 335 outputs the third delayed signal to the local phase detector 355 as a reference signal.

The clock network 345 receives the fourth delayed signal from the delay line 375 and distributes the fourth delayed signal to a global driver. The clock network 345 also distributes the fourth delayed signal to the local phase detector 355 as a feedback signal.

The local phase detector 350 receives the first delayed signal from the clock network 340 as a reference signal and the second delayed signal from the clock network 330 as a feedback signal. The local phase detector 350 determines a first phase difference between the feedback signal from the clock network 330 and the reference signal from the clock network 340. The local phase detector 350 outputs the first phase difference to the delay line 365.

The local phase detector 355 receives the third delayed signal from the clock network 335 as a reference signal and the fourth delayed signal from the clock network 345 as a feedback signal. The local phase detector 355 determines a second phase difference between the feedback signal from the clock network 345 and the reference signal from the clock network 335. The local phase detector 355 outputs the second phase difference to the delay line 375.

The global phase detector 380 receives the first delayed signal from the clock network 340 as a reference signal and the third delayed signal from the clock network 335 as a feedback signal. The global phase detector 380 determines a global phase difference between the feedback signal from the clock network 335 and the reference signal from the clock network 340. The global phase detector 380 outputs the global phase difference to the delay line 370.

The delay line 365 receives the first phase difference from the local phase detector 350. The delay line 365 can control the tunable delay applied to produce the second delayed signal, based on the first phase difference.

The delay line 375 receives the second phase difference from the local phase detector 355. The delay line 375 can control the tunable delay applied to produce the fourth delayed signal, based on the second phase difference.

The delay line 370 receives the global phase difference from the global phase detector 380. The delay line 370 can control the tunable delay applied to produce the third delayed signal, based on the global phase difference.

In many implementations of the present disclosure, a compensation mechanism includes a HIP unit, a compensator logic SIP unit, and a phase detector.

The HIP unit contains an analog delay line and an internal finite state machine (FSM), such as in delay lines 360, 365, 370, 375.

The compensator logic SIP unit (not pictured) in each local network (e.g., upper portion, lower portion) can control the delay lines and perform read/write services registers configuration and status readout.

The phase detector (e.g., phase detector 350, phase detector 355, phase detector 380) is located between two compensated clock networks while the phase detector output feeds back to a FSM to control the delay-line.

To achieve this compensation topology, the below sequence is used:
1) PLL lock enable asserted in clock source 310
2) Waiting for a PLL lock output indication
3) Global compensation de-skews two local networks using global phase detector 380

In parallel to the global compensation, local compensation of the delay line 365 will start compensation with respect to the delay line 360.

4) Wait for a global compensation "done" output signal to be asserted.
5) Local compensation of the delay line 375 will start compensation with respect to the delay line 370.
6) Once local compensation of delay lines 365 and 375 is completed, additional compensation can begin with respect to additional delay lines, relative to the delay line 365 or the delay line 375.

FIG. 4 illustrates a detailed clock distribution structure 400 including a global compensator, according to an implementation of the present disclosure.

The clock distribution structure 400 includes a clock source 410, four delay lines (i.e., delay line 465, delay line 460, delay line 470, and delay line 475), four clock networks (i.e., clock network 430, clock network 435, clock network 440, and clock network 445), four global drivers, two local phase detectors (i.e., local phase detector 450 and local phase detector 455), and global phase detector 480. The clock distribution structure 400 also includes global compensator 490, fixed delay line 493, and tunable delay line 496.

The clock source 410 receives a reference clock signal and outputs a global clock signal to a first node. The clock source 410 includes, for example, a phase-locked loop. The clock source 410 can control the global clock signal based on a feedback clock signal received from the clock network 440. The first node is thus a first point of divergence.

The global compensator 490 includes the fixed delay line 493 and the tunable delay line 496. The fixed delay line 493 receives the global clock signal from the first node. The fixed delay line 493 applies a fixed delay to the global clock signal to produce a first delayed global clock signal.

The tunable delay line 496 receives the global clock signal from the first node. The tunable delay line 496 applies a tunable delay to the global clock signal to produce a second delayed global clock signal. The tunable delay line 496 adjusts the tunable delay based on a global phase detector output received from the global phase detector 480.

An upper portion of the clock distribution structure 400, including the delay line 460 and the delay line 465, receives the first delayed global clock signal.

A lower portion of the clock distribution structure 400, including the delay line 470 and the delay line 475, receives the second delayed global clock signal.

Because the delay line 460 is in parallel with the delay line 465, a path from the delay line 493 to delay line 460 diverges at a second node from a path to the delay line 465. Likewise, because the delay line 470 is in parallel with the delay line 475, a path from the delay line 496 to the delay line 470 diverges at a third node from a path to the delay line 475.

Thus, the second and third nodes define points of divergence for the local compensation sequences. These PODs can be defined for additional local networks toward additional, respective spine inputs.

The delay line 460 receives the first delayed global clock signal. The delay line 460 applies a fixed delay to the first delayed global clock signal to produce a first delayed local signal output to the clock network 440.

The delay line 465 also receives the first delayed global clock signal. The delay line 465 applies a tunable delay to the first delayed global clock signal to produce a second delayed local signal output to the clock network 430.

The delay line 470 receives the second delayed global clock signal. The delay line 470 applies a fixed delay to the second delayed global clock signal to produce a third delayed local signal output to the clock network 435.

The delay line 475 also receives the second delayed global clock signal. The delay line 475 applies a tunable delay to the second delayed global clock signal to produce a fourth delayed local signal output to the clock network 445.

The clock network 440 receives the first delayed local signal from the delay line 460 and distributes the first delayed local signal to a global driver. The clock network 440 also outputs the first delayed local signal to the local phase detector 450 as a reference signal. In addition, the clock network 440 outputs the first delayed local signal to the global phase detector 480 as a reference signal. Further, the clock network 440 outputs the first delayed local signal to the clock source 410 as a feedback clock signal.

The clock network 430 receives the second delayed local signal from the delay line 465 and distributes the second delayed local signal to a global driver. The clock network 430 also outputs the second delayed local signal to the local phase detector 450 as a feedback signal.

The clock network 435 receives the third delayed local signal from the delay line 470 and distributes the third delayed local signal to a global driver. The clock network 435 also outputs the third delayed local signal to the global phase detector 480 as a feedback signal. In addition, the clock network 435 outputs the third delayed local signal to the local phase detector 455 as a reference signal.

The clock network 445 receives the fourth delayed local signal from the delay line 475 and distributes the fourth delayed local signal to a global driver. The clock network 445 also distributes the fourth delayed local signal to the local phase detector 455 as a feedback signal.

The local phase detector 450 receives the first delayed local signal from the clock network 440 as a reference signal and the second delayed local signal from the clock network 430 as a feedback signal. The local phase detector 450 determines a first phase difference between the feedback signal from the clock network 430 and the reference signal from the clock network 440. The local phase detector 450 outputs the first phase difference to the delay line 465.

[ono] The local phase detector 455 receives the third delayed local signal from the clock network 435 as a reference signal and the fourth delayed local signal from the clock network 445 as a feedback signal. The local phase detector 455 determines a second phase difference between the feedback signal from the clock network 445 and the reference signal from the clock network 435. The local phase detector 455 outputs the second phase difference to the delay line 475.

The global phase detector 480 receives the second delayed local signal from the clock network 440 as a reference signal and the third delayed local signal from the clock network 435 as a feedback signal. The global phase detector 480 determines a global phase difference between the feedback signal from the clock network 435 and the reference signal from the clock network 440. The global phase detector 480 outputs the global phase difference to the tunable delay line 496.

The delay line 465 receives the first phase difference from the local phase detector 450. The delay line 465 can control the tunable delay applied to produce the second delayed local signal, at least partially based on the first phase difference.

The delay line 475 receives the second phase difference from the local phase detector 455. The delay line 475 can control the tunable delay applied to produce the fourth delayed local signal, at least partially based on the second phase difference.

The tunable delay line 496 receives the global phase difference from the global phase detector 480. The tunable delay line 496 can control the tunable delay applied to produce the second delayed global clock signal, at least partially based on the global phase difference.

In some implementations, the delay line 460 and the delay line 493 are fixed and not tunable, since they are driving the clock source feedback and act as reference delays for compensation (e.g., PLL in long loop feedback mode).

Since the tunable delay line 496 of the global compensator 490 can tune the delay line 470 and the delay line 475, the delay line 470 can be fixed, as well.

In a conventional clock distribution structure, there is a single clock domain that pushes six different spines (e.g., clock structures) with a single PLL. The spines of the conventional clock distribution structure are compensated to a reference spine in cascaded mode. In such a design, the longest path can be approximately 10,000 um which is the baseline distance for all other clock paths. This distance is also the baseline distance for the phase detectors' paths back to the main compensator unit.

A comparison was performed between a conventional clock spread method and the present clock spread method.

TABLE 1

| # | clk src name | length [um] | Number of chains | Total cap [pF] |
|---|---|---|---|---|
| 1 | spinedqh | 9200 | 48 | 3.710208 |
| 2 | spineeqh | 9200 | 48 | 3.710208 |
| 3 | spinefqh | 9200 | 48 | 3.710208 |
| 4 | ringrep1 | 9200 | 48 | 3.710208 |
| 5 | uclkspine_s0_h | 9200 | 48 | 3.710208 |
| 6 | uclkspine_s1_h | 9200 | 48 | 3.710208 |
| 7 | total cap | | | 22.261248 |

TABLE 2

| # | clk src name | length [um] | clksrc→ global/ local | Number of chains till glb POD/lcl POD | Total cap [pF] |
|---|---|---|---|---|---|
| 1 | par_ccf_ring_global_up | 4595 | global | 22 | 1.70051 |
| 2 | par_ccf_ring_global_dn | 4804 | global | 24 | 1.8551 |
| 3 | par_ccf_ring_local_up_cbo0 | 2800 | local | 14 | 1.08214 |
| 4 | par_ccf_ring_local_up_cbo1 | 2800 | local | 14 | 1.08214 |
| 5 | par_ccf_ring_local_up_ringrep1 | 2800 | local | 14 | 1.08214 |
| 6 | par_ccf_ring_local_dn_cbo2 | 2591 | local | 12 | 0.92755 |
| 7 | par_ccf_ring_local_dn_ringrep2 | 2591 | local | 12 | 0.92755 |
| 8 | par_ccf_ring_local_dn_cbo3 | 2591 | local | 12 | 0.92755 |
| 9 | total cap | | | | 9.5847 |

For the present method, the total capacitance for an implementation was estimated as about 10.59 pF.

Table 3 summarizes the capacitance of one implementation of the present disclosure and of a conventional method, as well as estimating the corresponding saved power. Thus, Table 3 summarizes total power saving of the implementation of the present disclosure over the conventional method.

TABLE 3

| | |
|---|---|
| Total power according to implementation of present disclosure | 10.59 |
| Total power with conventional method | 22.261248 |
| Power Saving [%] | 52.4 |

In an implementation of the present disclosure, both a PLL and the compensator delay-lines can be efficiently centralized. Thus, on top of saving power, the implementation reduced the number of repeaters (e.g., the number of stages) in the longest clock path. Specifically, whereas a conventional clock spread method used 48 repeaters, the implementation of the present disclosure could use only 36 stages. This reduction in the number of stages then improved the overall skew variation.

Further, the conventional compensator IP unit that contains six delay-lines has an area of 120 um×50 um. In contrast, an implementation according to the present disclosure includes a small, compact compensator IP unit that has an area of 10 um×40 um. Accordingly, some implementations of the present disclosure can significantly reduce the area of the clock distribution structure and create a closer POD for each clock spread. This improvement can provide flexibility to place delay-lines according to a floorplan.

Figure 5:
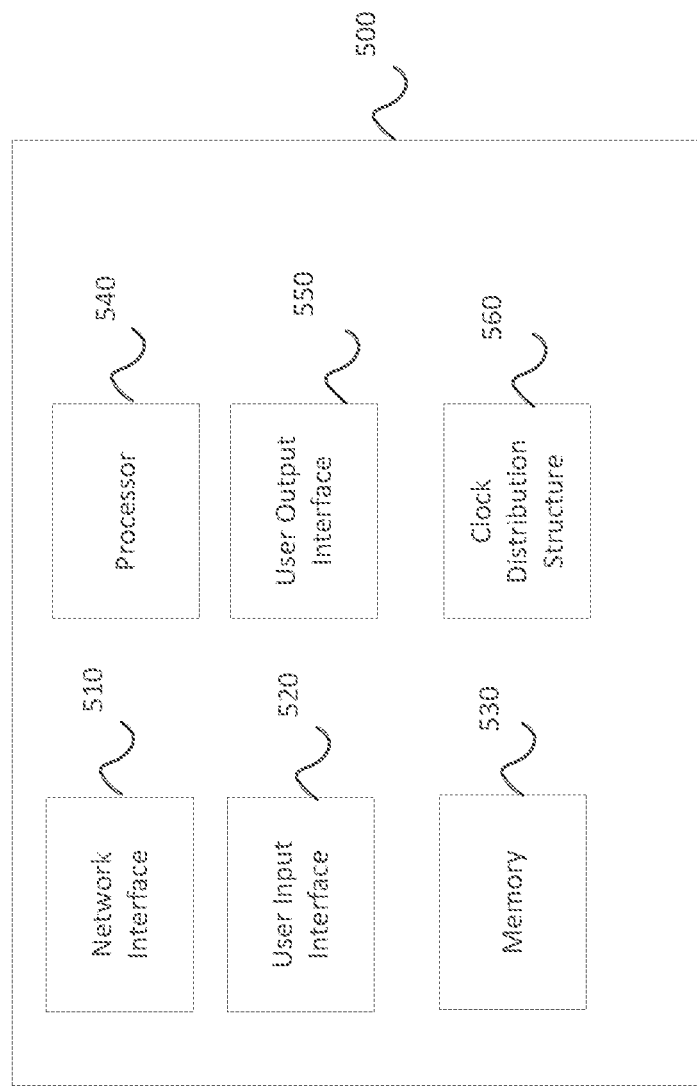
FIG. 5 illustrates a computing device, according to an implementation of the present disclosure.

FIG. 5 illustrates a computing device 500, according to an implementation of the present disclosure. The computing device 500 can include a network interface 510, a user input interface 520, a memory 530, a processor 540, a user output interface 550, and a clock distribution structure 560.

Although illustrated within a single housing, the computing device 500 can be distributed across plural housings or sub-systems that cooperate in executing program instructions. In some implementations, the computing device 500 can include one or more blade server devices, standalone server devices, personal computers, routers, hubs, switches, bridges, firewall devices, intrusion detection devices, mainframe computers, network-attached storage devices, smartphones and other mobile telephones, and other types of computing devices. The system hardware can be configured according to any computer architecture, such as a Symmetric Multi-Processing (SMP) architecture or a Non-Uniform Memory Access (NUMA) architecture.

The network interface 510 provides one or more communication connections and/or one or more devices that allow for communication between the computing device 500 and other computing systems (not shown) over a communication network or collection of networks (not shown) or the air. The network interface can communicate using near-field communications (NFC), Wi-Fi™, Bluetooth, Ethernet, facsimile, or any other wired or wireless interface.

The user input interface 520 receives inputs from a human. The user input interface 520 can be or include a mouse, a touchpad, a keyboard, a touchscreen, a trackball, a camera, a microphone, a joystick, a game controller, a scanner, a stylus, or any other input device.

The memory 530, also termed a "storage," can include or be one or more computer-readable storage media readable by the processor 540 and that store software. The memory 530 can be implemented as one storage device and can also be implemented across multiple co-located or distributed storage devices or sub-systems. The memory 530 can include additional elements, such as a controller, that communicate with the processor 540. The memory 530 can also include storage devices and/or sub-systems on which data and/or instructions are stored. The computing device 500 can access one or more storage resources to access information to carry out any of the clock compensation processes indicated in this disclosure.

The memory 530 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 530 can be or include resistive RAM (RRAM) or a magneto-resistive RAM (MRAM).

Software stored in the memory 530 can include routines for at least partially performing at least one of the clock compensation processes and can be implemented in program instructions. Further, the software, when executed by the computing device 500 in general or the processor 540 specifically, can direct, among other functions, the computing device 500 or the processor 540 to perform the compensation as described herein.

The processor 540 can be or include one or more hardware processors and/or other circuitry that retrieve and execute software from the memory 530. The processor 540 can be implemented within one processing device, chip, or package and can also be distributed across multiple processing devices, chips, packages, or sub-systems that cooperate in executing program instructions.

In some implementations, the processor 540 is or includes a Graphics Processing Unit (GPU). The GPU can benefit the visual/image processing in the computing device 500. The GPU, or any second-order processing element independent from the processor 540 dedicated to processing imagery and other perception data in real or near real-time, can provide a processing benefit for video processing or other applications (e.g., cryptocurrency).

The processor 540 can have any register size, such as a 32-bit register or a 64-bit register, among others. The processor 540 can include multiple cores. Implementations of the processor 540 are not limited to any particular number of threads. The processor 540 can be fabricated by any process technology, such as 14 nm process technology.

The user output interface 550 outputs information to a human user. The user output interface 550 can be or include a display (e.g., a screen), a touchscreen, one or more speakers, a printer, or a haptic feedback unit. In some implementations, the user output interface 550 displays QR codes for communication with other devices.

The clock distribution structure 500 can be or include any of clock distribution structure 200, clock distribution structure 300, or clock distribution structure 400 or other implementation according to the present disclosure and/or appended claims.

In implementations where the system 500 includes multiple computing devices, a server of the system or, in a serverless implementation, a peer can use one or more communications networks that facilitate communication among the computing devices. For example, the one or more communications networks can include or be a local area network (LAN), wide area network (WAN), or Metropolitan Area Network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media," "computer-readable storage media," or "computer-readable storage medium" can refer to non-transitory storage media, such as a hard drive, a memory chip, and cache memory, and to transitory storage media, such as carrier waves or propagating signals.

Aspects of the system for clock compensation can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various embodiments, different operations and portions of the operations of the methods described can be performed by different processing units. Furthermore, aspects of the present disclosure can take the form of a computer program product embodied in one or more computer-readable media having computer-readable program code embodied, e.g., encoded or stored, thereon. In various implementations, such a computer program can, for example, be downloaded to (or updated on) existing devices and systems or be stored upon manufacturing of these devices and systems.

In the description, reference is made to the drawings where like reference numerals can indicate identical or functionally similar elements. Elements illustrated in the drawings are not necessarily drawn to scale. Additionally, certain implementations can include more or fewer elements than illustrated in a drawing and/or a subset of the elements illustrated in a drawing. Further, some implementations can incorporate a suitable combination of features from two or more drawings.

The components, arrangements, and/or features of the disclosure are described in connection with various implementations and are merely examples to simplify the present disclosure and are not intended to be limiting. In the development of actual implementations, implementation-specific decisions can be made to achieve a developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The attached drawings depict spatial relationships between various components and to the spatial orientation of various aspects of components. The devices, components, members, and apparatuses can be positioned in any orientation. Thus, the use of terms such as "above", "below", "upper", "lower", "top", "bottom", or other similar terms to describe a spatial relationship between various components or to describe the spatial orientation of aspects of such components describes a relative relationship between the components or a spatial orientation of aspects of such components, respectively, as the components described can be oriented in any direction.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that holds components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in an emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and radio frequency functions. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors, logic operations, delay lines) have been offered for non-limiting purposes of example and teaching. Various modifications and changes can be made to arrangements of such components. The description and drawings are, accordingly, to be regarded in an illustrative sense, not in a restrictive sense.

With the numerous examples provided herein, interaction was described in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, it might be easier to describe one or more of the functionalities of a given set of flows by referencing a limited number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

Examples

Example 1 is an apparatus for clock compensation, the apparatus including a clock source configured to output a clock signal; a first delay line to receive a first clock source signal and produce a first output, the first clock source signal at least partially based on the clock signal; a first clock spine that receives the first output and produces a global reference clock signal; a second delay line to receive a second clock source signal and produce a second output, the second clock source signal at least partially based on the clock signal; a second clock spine that receives the second output and produces a global feedback clock signal; and a global phase detector to detect a phase difference between the global reference clock signal and the global feedback clock signal to produce a global phase detector output, wherein the second clock source signal is controlled at least partially based on the global phase detector output.

In Example 2, the subject matter of Example 1 optionally can include that the second delay line receives the global phase detector output.

In Example 3, the subject matter of any of Examples 1-2 optionally can include a third delay line to receive the first clock source signal and produce a third output; a third clock spine that receives the third output and produces a local feedback signal; and a local phase detector to detect a phase difference between a local reference signal and the local feedback signal to produce a local phase detector output, wherein the first clock spine produces the local reference signal.

In Example 4, the subject matter of Example 3 optionally can include that the third delay line receives the local phase detector output.

In Example 5, the subject matter of any of Examples 1-4 optionally can include that the clock source includes a phase-locked loop that receives a reference clock and a feedback clock signal and generates the clock signal, and the first clock spine produces the feedback clock signal.

In Example 6, the subject matter of any of Examples 1-5 optionally can include a global compensator unit including a first global delay line and a second global delay line, wherein the first global delay line receives the clock signal and outputs the first clock source signal, and the second global delay line receives the clock signal and outputs the second clock source signal.

In Example 7, the subject matter of Example 6 optionally can include that the second global delay line receives the global phase detector output.

Example 8 is a system including the subject matter of any of Examples 1-7.

Example 9 is a method for clock compensation, the method including producing, with a first delay line, a first output, at least partially based on a first clock source signal, the first clock source signal at least partially based on a clock signal; producing, with a first clock spine, a global reference clock signal, the global reference clock signal at least partially based on the first output; producing, with a second delay line, a second output, at least partially based on a second clock source signal, the second clock source signal at least partially based on the clock signal; producing, with a second clock spine, a global feedback clock signal, the global feedback clock signal at least partially based on the second output; and detecting a phase difference between the global reference clock signal and the global feedback clock signal to produce a global phase detector output, wherein the second clock source signal is controlled at least partially based on the global phase detector output.

In Example 10, the subject matter of Example 9 optionally can include that the second delay line receives the global phase detector output.

In Example 11, the subject matter of any of Examples 9-10 optionally can include producing, with a third delay line, a third output, at least partially based on the first clock source signal; producing, with a third clock spine, a local feedback signal, at least partially based on the third output; and detecting a phase difference between a local reference signal and the local feedback signal to produce a local phase detector output, wherein the first clock spine produces the local reference signal.

In Example 12, the subject matter of any of Example 11 optionally can include that the third delay line receives the local phase detector output.

In Example 13, the subject matter of any of Examples 9-12 optionally can include generating, with a phase-locked loop, the clock signal, at least partially based on a reference clock and a feedback clock signal; and producing, with the first clock spine, the feedback clock signal.

In Example 14, the subject matter of any of Examples 9-13 optionally can include outputting, with a first global delay line, the first clock source signal, at least partially based on the clock signal; and outputting, with a second global delay line, the second clock source signal, at least partially based on the clock signal.

In Example 15, the subject matter of Example 14 optionally can include that the second global delay line receives the global phase detector output.

Example 16 is an apparatus comprising means to perform the subject matter of any of Examples 9-15.

Example 17 is a machine readable medium including code, when executed, to cause a machine to perform the subject matter of any one of Examples 9-15.

Example 18 is a non-transitory, computer-readable medium encoded with instructions that, when executed by a computer, cause the computer to perform a method comprising: producing, with a first delay line, a first output, at least partially based on a first clock source signal, the first clock source signal at least partially based on a clock signal, wherein a first clock spine produces a global reference clock signal, at least partially based on the first output; and producing, with a second delay line, a second output, at least partially based on a second clock source signal, the second clock source signal at least partially based on the clock signal, wherein a second clock spine produces a global feedback clock signal, the global feedback clock signal at least partially based on the second output, a phase difference is detected between the global reference clock signal and the global feedback clock signal to produce a global phase detector output, and the second clock source signal is controlled at least partially based on the global phase detector output.

In Example 19, the subject matter of Example 18 optionally can include that the second delay line receives the global phase detector output.

In Example 20, the subject matter of any of Examples 18-19 optionally can include producing, with a third delay line, a third output, at least partially based on the first clock source signal, wherein a third clock spine produces a local feedback signal, at least partially based on the third output, a phase difference is detected between a local reference signal and the local feedback signal to produce a local phase detector output, and the first clock spine produces the local reference signal.

In Example 21, the subject matter of Example 20 optionally can include that the third delay line receives the local phase detector output.

In Example 22, the subject matter of any of Examples 18-21 optionally can include that a phase-locked loop generates the clock signal, at least partially based on a reference clock and a feedback clock signal, and the first clock spine produces the feedback clock signal.

In Example 23, the subject matter of any of Examples 18-22 optionally can include outputting, with a first global delay line, the first clock source signal, at least partially based on the clock signal; and outputting, with a second global delay line, the second clock source signal, at least partially based on the clock signal.

In Example 24, the subject matter of Example 23 optionally can include that the second global delay line receives the global phase detector output.

Example 25 is an apparatus including means for outputting a clock signal; first delay means for receiving a first clock source signal and producing a first output, the first clock source signal at least partially based on the clock signal; means for receiving the first output and producing a global reference clock signal; second delay means for receiving a second clock source signal and producing a second output, the second clock source signal at least partially based on the clock signal; means for receiving the second output and producing a global feedback clock signal; and means for detecting a phase difference between the global reference clock signal and the global feedback clock signal to produce a global phase detector output, wherein the second clock source signal is controlled at least partially based on the global phase detector output.

In Example 26, the subject matter of Example 25 optionally can include that the second delay means receives the global phase detector output.

In Example 27, the subject matter of any of Examples 25-26 optionally can include third delay means for receiving the first clock source signal and producing a third output; means for receiving the third output and producing a local feedback signal; and means for detecting a phase difference between a local reference signal and the local feedback signal to produce a local phase detector output, wherein the means for receiving the first output produces the local reference signal.

In Example 28, the subject matter of Example 27 optionally can include that the third delay means receives the local phase detector output.

In Example 29, the subject matter of any of Examples 25-28 optionally can include that the means for outputting the clock signal includes a phase-locked loop that receives a reference clock and a feedback clock signal and generates the clock signal, and the means for receiving the first output produces the feedback clock signal.

In Example 30, the subject matter of any of Examples 25-29 optionally can include a global compensator unit including first global delay means and second global delay means, the first global delay means for receiving the clock signal and outputting the first clock source signal, and the second global delay means for receiving the clock signal and outputting the second clock source signal.

In Example 31, the subject matter of Example 30 optionally can include that the second global delay means receives the global phase detector output.

We claim:

1. An apparatus, comprising:
a clock source configured to output a clock signal;
a first delay line to receive a first clock source signal and produce a first output, the first clock source signal at least partially based on the clock signal;
a first clock spine that receives the first output and produces a global reference clock signal;
a second delay line to receive a second clock source signal and produce a second output, the second clock source signal at least partially based on the clock signal;
a second clock spine that receives the second output and produces a global feedback clock signal; and
a global phase detector to detect a phase difference between the global reference clock signal and the global feedback clock signal to produce a global phase detector output, wherein the second clock source signal is controlled at least partially based on the global phase detector output;
wherein the clock source includes a phase-locked loop that receives a reference clock and a feedback clock signal and generates the clock signal, and the first clock spine produces the feedback clock signal.

2. The apparatus of claim 1, wherein the second delay line receives the global phase detector output.

3. The apparatus of claim 1, further comprising:
a third delay line to receive the first clock source signal and produce a third output;
a third clock spine that receives the third output and produces a local feedback signal; and
a local phase detector to detect a phase difference between a local reference signal and the local feedback signal to produce a local phase detector output, wherein the first clock spine produces the local reference signal.

4. The apparatus of claim 3, wherein the third delay line receives the local phase detector output.

5. The apparatus of claim 1, further comprising:
a global compensator unit including a first global delay line and a second global delay line, wherein the first global delay line receives the clock signal and outputs the first clock source signal, and the second global delay line receives the clock signal and outputs the second clock source signal.

6. The apparatus of claim 5, wherein the second global delay line receives the global phase detector output.

7. A method, comprising:
producing, with a first delay line, a first output, at least partially based on a first clock source signal, the first clock source signal at least partially based on a clock signal;
producing, with a first clock spine, a global reference clock signal, the global reference clock signal at least partially based on the first output;
producing, with a second delay line, a second output, at least partially based on a second clock source signal, the second clock source signal at least partially based on the clock signal;
producing, with a second clock spine, a global feedback clock signal, the global feedback clock signal at least partially based on the second output;
detecting a phase difference between the global reference clock signal and the global feedback clock signal to produce a global phase detector output, wherein the second clock source signal is controlled at least partially based on the global phase detector output; and
generating, with a phase-locked loop, the clock signal, at least partially based on a reference clock and a feedback clock signal; and
producing, with the first clock spine, the feedback clock signal.

8. The method of claim 7, wherein the second delay line receives the global phase detector output.

9. The method of claim 7, further comprising:
producing, with a third delay line, a third output, at least partially based on the first clock source signal;
producing, with a third clock spine, a local feedback signal, at least partially based on the third output; and detecting a phase difference between a local reference signal and the local feedback signal to produce a local phase detector output, wherein the first clock spine produces the local reference signal.

10. The method of claim 9, wherein the third delay line receives the local phase detector output.

11. The method of claim 7, further comprising:
outputting, with a first global delay line, the first clock source signal, at least partially based on the clock signal; and
outputting, with a second global delay line, the second clock source signal, at least partially based on the clock signal.

12. The method of claim 11, wherein the second global delay line receives the global phase detector output.

13. A non-transitory, computer-readable medium encoded with instructions that, when executed by a computer, cause the computer to perform a method comprising:
producing, with a first delay line, a first output, at least partially based on a first clock source signal, the first clock source signal at least partially based on a clock signal, wherein a first clock spine produces a global reference clock signal, at least partially based on the first output; and
producing, with a second delay line, a second output, at least partially based on a second clock source signal, the second clock source signal at least partially based on the clock signal, wherein
a second clock spine produces a global feedback clock signal, the global feedback clock signal at least partially based on the second output, a phase difference is detected between the global reference clock signal and the global feedback clock signal to produce a global phase detector output, and the second clock source signal is controlled at least partially based on the global phase detector output;
wherein a phase-locked loop generates the clock signal, at least partially based on a reference clock and a feedback clock signal, and the first clock spine produces the feedback clock signal.

14. The medium of claim 13, wherein the second delay line receives the global phase detector output.

15. The medium of claim 13, the method further comprising:
producing, with a third delay line, a third output, at least partially based on the first clock source signal, wherein a third clock spine produces a local feedback signal, at least partially based on the third output, a phase difference is detected between a local reference signal and the local feedback signal to produce a local phase detector output, and the first clock spine produces the local reference signal.

16. The medium of claim 15, wherein the third delay line receives the local phase detector output.

17. The medium of claim 13, the method further comprising:
outputting, with a first global delay line, the first clock source signal, at least partially based on the clock signal; and
outputting, with a second global delay line, the second clock source signal, at least partially based on the clock signal.

* * * * *